(12) United States Patent
Ou et al.

(10) Patent No.: US 8,643,965 B2
(45) Date of Patent: Feb. 4, 2014

(54) ENHANCED PRISM FILM

(75) Inventors: Shengjia Ou, Beijing (CN); Qi Zhang, Beijing (CN)

(73) Assignee: Beijing BOE Optoelectronics Technology Co., Ltd., Beijing (CN)

(*) Notice: Subject to any disclaimer, the term of this patent is extended or adjusted under 35 U.S.C. 154(b) by 485 days.

(21) Appl. No.: 12/716,534

(22) Filed: Mar. 3, 2010

(65) Prior Publication Data

US 2010/0226025 A1    Sep. 9, 2010

(30) Foreign Application Priority Data

Mar. 3, 2009   (CN) .......................... 2009 1 0079139

(51) Int. Cl.
    *G02B 5/04*       (2006.01)
(52) U.S. Cl.
    USPC .......................................... 359/837; 359/831
(58) Field of Classification Search
    USPC ........... 359/599, 615, 831, 834, 837; 362/620
    See application file for complete search history.

(56) References Cited

U.S. PATENT DOCUMENTS

| | | | | |
|---|---|---|---|---|
| 1,950,560 A | * | 3/1934 | Martinek et al. | 359/533 |
| 3,129,895 A | * | 4/1964 | Franck | 362/330 |
| 3,320,019 A | * | 5/1967 | Brunelle, Jr. et al. | 359/836 |
| 4,118,763 A | * | 10/1978 | Osteen | 362/339 |
| 6,020,553 A | * | 2/2000 | Yogev | 136/246 |
| 6,097,554 A | * | 8/2000 | Watkins | 359/834 |
| 6,700,716 B2 | * | 3/2004 | Sejkora | 359/834 |
| 6,827,456 B2 | | 12/2004 | Parker et al. | |
| 6,997,595 B2 | * | 2/2006 | Mi et al. | 362/626 |
| 7,715,132 B2 | * | 5/2010 | Chang | 359/831 |
| 8,328,371 B2 | * | 12/2012 | Taniguchi | 359/601 |
| 2002/0163729 A1 | * | 11/2002 | Myers | 359/613 |
| 2007/0139965 A1 | | 6/2007 | Liao | |
| 2007/0202673 A1 | | 8/2007 | Kim et al. | |
| 2008/0117515 A1 | * | 5/2008 | Hsu et al. | 359/599 |
| 2008/0130116 A1 | * | 6/2008 | Hsu et al. | 359/599 |
| 2008/0219026 A1 | | 9/2008 | Zhu | |

FOREIGN PATENT DOCUMENTS

| | | |
|---|---|---|
| CN | 101261338 A | 9/2008 |
| CN | 101329423 A | 12/2008 |
| KR | 2004-0107229 A | 12/2004 |

OTHER PUBLICATIONS

International Search Report: PCT/KR2008/005165, Mar. 6, 2009.

* cited by examiner

*Primary Examiner* — Ricky D Shafer
(74) *Attorney, Agent, or Firm* — Ladas & Parry LLP

(57) ABSTRACT

The present disclosure relates to an enhanced prism film comprising a plurality of column-like elements extending in a first direction. The plurality of column-like elements abut against one another in a second direction different form the first direction so as to form a light exiting surface of the enhanced prism film with converging effect in both the first and second direction.

7 Claims, 5 Drawing Sheets

A - A

B - B

ENHANCED PRISM FILM

BACKGROUND

The present invention relates to an optical structural film of backlight in a liquid crystal display device (LCD), in particular, to an enhanced prism film.

Optical structural films of the backlight in a LCD are typically used for enhancing the brightness and broadening the viewing angle of the LCD. FIG. 11 is a schematic view showing a conventional optical structural film of a backlight with an edge illumination structure. As shown in FIG. 11, the optical structural film of the backlight comprises a light guide plate 10, a diffusion film 20 and a prism film 30. A light source 40 disposed on at least one side of the optical structural film emits a light beam 50, which is introduced into the prism film 30 by the light guide plate 10. The prism film 30 then converges incident lights into a smaller range of angle for improving the brightness due to light refraction and total reflection of the prism film 30.

The conventional prism film is composed of a plurality of prism bars extending in a same direction, and each prism bar has a cross section shape of isosceles triangle. The conventional prism film can direct illumination lights only within a certain angle range to emit out of the prism film in the normal direction of upper surface of the prism film due to the straight line profile along axial direction of the prism bar, since outgoing lights incident on the upper surface of the prism bar with an angle exceeding the total reflection angle would not emit from the prism film due to the total reflection. Consequently, the brightness along the axial direction of the conventional prism film drops significantly as the viewing angle increases.

SUMMARY

The embodiment of the present invention provides an enhanced prism film with improved viewing angle.

According to one embodiment of the present invention, the enhanced prism film comprises a plurality of column-like elements extending in a first direction. The plurality of column-like elements abut against one another in a second direction different form the first direction so as to form a light exiting surface of the enhanced prism film with converging effect in both the first and second direction.

In one embodiment, the cross section of the light exiting surface of the enhanced prism film along the first direction comprises a plurality of triangles connected with each other sequentially and the cross section of the light exiting surface of the enhanced prism film along the second direction comprises a plurality of arches connected with each other sequentially. For example, the arch can have a shape selected from a group consisting of a semicircle, a semi-ellipse, a circular arch and an elliptical arch.

In another embodiment, each column-like element comprises a plurality of first partial truncated cones and a plurality of second partial truncated cones alternately connected with each other in such a manner that the bottom of each first partial truncated cone abuts against the bottom of the adjacent second partial truncated cone and the top of the first partial truncated cone abuts against the top of the adjacent second partial truncated cone.

The term of "partial truncated cone" in this context can refer to a three dimensional body obtained by cutting along the axial direction of a truncated cone, thus each partial truncated cones in the column-like element in the enhanced prism film according to the embodiments of the present invention can comprise a top, a bottom, a cone surface as a part of upper surface of the enhanced prism film and a flat surface opposite to the cone surface.

The bottom of the first partial truncated cone can have a width larger than a width of the top of the first partial truncated cone, and the bottom of the second partial truncated cone can have a width larger than a width of the top of the second partial truncated cone. The first partial truncated cone of each column-like element can abut against the second partial truncated cone of adjacent column-like element.

In one embodiment, the bottom of the first partial truncated cone can have a width of 50-100 μm and the bottom of the second partial truncated cone can have a width of 50-100 μm, the top of the first partial truncated cone can have a width of 20-60 μm and the bottom of the second partial truncated cone can have a width of 20-60 μm. The first partial truncated cone can have a height of 10-50 μm, and the second partial truncated cone can have a height of 10-50 μm.

In one embodiment, the first partial truncated cone can have an inclined angle of 30°-60° between the bottom and the cone surface of the first partial truncated cone, and the first partial truncated cone can have an inclined angle of 30°-60° between the bottom and the cone surface of the first partial truncated cone.

In yet another embodiment, the bottom of the first partial truncated cone and the bottom of the second partial truncated cone can have an angle δ relative to the second direction, where $0°≤δ≤45°$, or $-45°≤δ≤0°$.

In yet another embodiment, the bottom of the first partial truncated cone and the bottom of the second partial truncated cone of a first column-like element can have an angle δ1 relative to the second direction, and where $0°≤δ1≤45°$, and the bottom of the first partial truncated cone and the bottom of the second partial truncated cone of a second column-like element directly abutting against the first column-like element can have an angle δ2 relative to the second direction, and where $-45°≤δ2≤0°$.

According to the enhanced prism film of the present invention, the upper surface of the enhanced prism film can be composed of a plurality of arches along the second direction. In this case, there is no dead zone around a viewing angle of 45° for the enhanced prism film of the present invention. Instead, the brightness can drop slowly around the viewing angle of 45° and be kept at a relative high level even around viewing angle of 60°, thus improving the viewing angle of LCD. Furthermore, the upper surface of the enhanced prism film according to the present invention presents a discontinuous curved surface with a plurality of three-dimensional microstructures in a relatively random distribution, thus preventing the interference of the lights exiting from the enhanced prism film.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

The embodiments of the present invention will be discussed in more detail with reference to the accompanying drawings.

Figure 1:
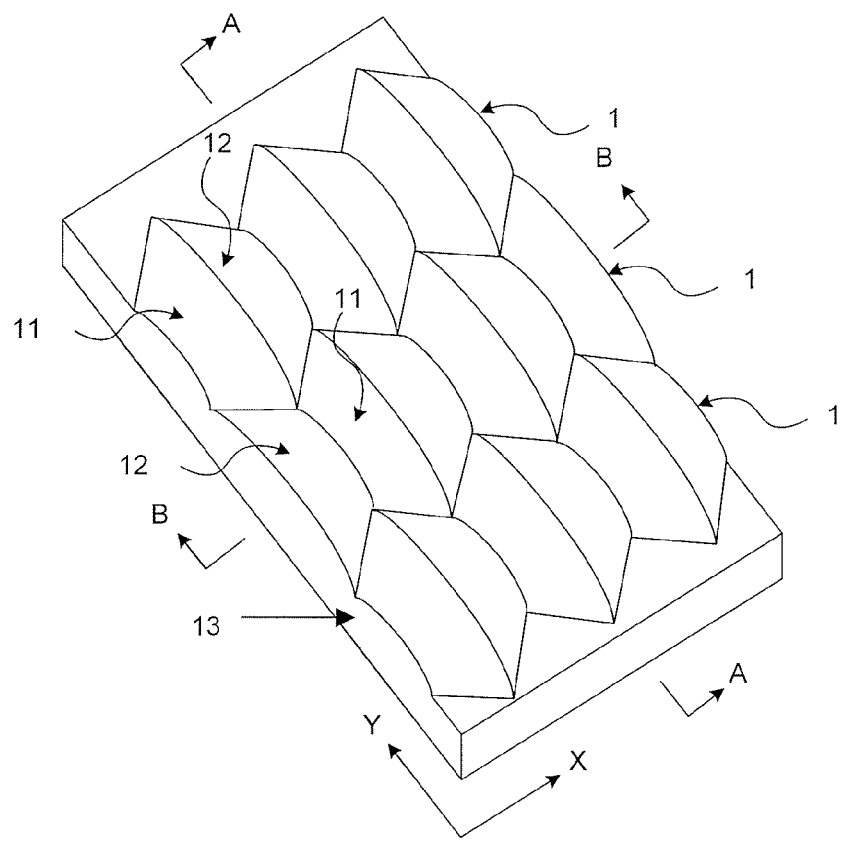
FIG. 1 is a schematic perspective view showing a first embodiment of the enhanced prism film according to the present embodiment.

FIG. 1 is a schematic perspective view showing a first embodiment of the enhanced prism film according to the present invention. The enhanced prism film according to the first embodiment comprises a plurality of column-like elements 1 formed on a base film 13. Each column-like element 1 extends in a first direction X. Each column-like element 1 can be described as having a plurality of first partial truncated cones 11 and a plurality of second partial truncated cones 12 alternately connected with each other in such a manner that the bottom of each first partial truncated cone 11 abuts against the bottom of the adjacent second partial truncated cone 12 and the top of the first partial truncated cone 11 abuts against the top of the adjacent second partial truncated cone 12. The bottom of the first partial truncated cone 11 has a width larger than a width of the top of the first partial truncated cone 11, and the bottom of the second partial truncated cone 12 has a width larger than a width of the top of the second partial truncated cone 12. It is noted that each column-like element 1 can be also described as having multiple straight screw lines parallel to each other around the column with an outline similar as a bamboos or a bellows or a corrugated pipe.

Figure 2:
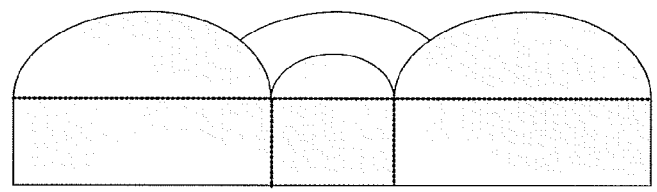
FIG. 2 is a sectional view taken along line A-A in FIG. 1.

The plurality of column-like elements 1 abut against one another sequentially in a second direction Y different from a first direction X so that the first partial truncated cone 11 of each column-like element abuts against the second partial truncated cone 12 of adjacent column-like element. As shown in FIG. 1, the first direction X is perpendicular to the second direction Y. The first partial truncated cone 11 and the second partial truncated cone 12 of each column-like element 1 can be a regular partial truncated cone in which the top and the bottom of the partial truncated cone are parallel and the angle between the inclined cone surface and the bottom of the partial truncated cone is constant. In this case, the upper surface of the enhanced prism film has a plurality of microstructures with converging effect in both the first direction X and the second direction Y FIG. 2 is a sectional view taken along line A-A in FIG. 1. As shown in FIG. 2, the upper surface of the enhanced prism film can have a cross sectional shape along the second direction Y comprising a plurality of arches connected sequentially with each other. The arch can have any kinds of curve shape, such as a semicircle, a semi-ellipse, a circular arch, an elliptical arch etc. The cross sectional shape along the second direction Y can also comprise a plurality of connected line segments approximating to an arch.

Figure 3:
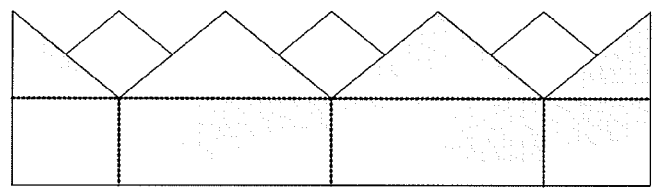
FIG. 3 is a sectional view taken along line B-B in FIG. 2.

FIG. 3 is a sectional view taken along line B-B in FIG. 2. As shown in FIG. 3, the upper surface of the enhanced prism film can have a cross sectional shape along the first direction X comprising a plurality of triangles connected sequentially with each other. The triangle can also have round vertex or other variants. As shown in FIGS. 2 and 3, the upper surface of the enhanced prism film can have an outline with connected curve lines along the Y direction and an outline with connected triangles along X direction.

Figure 4:
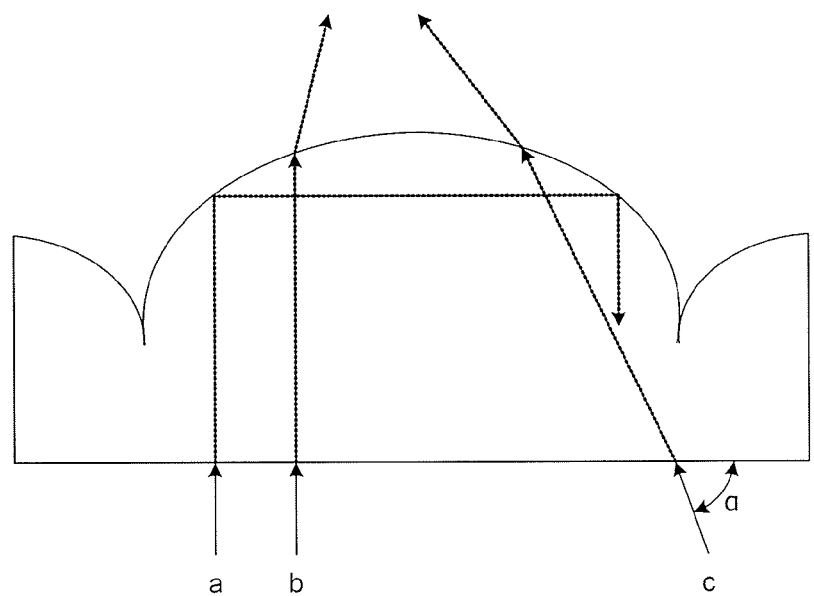
FIG. 4 is a schematic view showing the principle of converging effect of the first embodiment of the enhanced prism film according to the present embodiment along the second direction.

FIG. 4 is a schematic view showing the principle of converging effect of the first embodiment of the enhanced prism film along the second direction Y. As shown in FIG. 4, a light beam "a" incident in a direction perpendicular to the lower surface of the enhanced prism film is totally reflected back into the prism film at a location away from the center of the arch, whereas the light beam "b" incident in a direction perpendicular to the lower surface of the enhanced prism film in the vicinity of center of the arch emits out of the upper surface of the prism film, and the light beam "c" incident into the prism film with an angle a relative to the lower surface of the prism film also emits out of the upper surface of the prism film. In this case, the upper surface of the enhanced prism film can converge light within a certain angle range and distribute the emitting light relatively uniformly in all directions.

Figure 5:
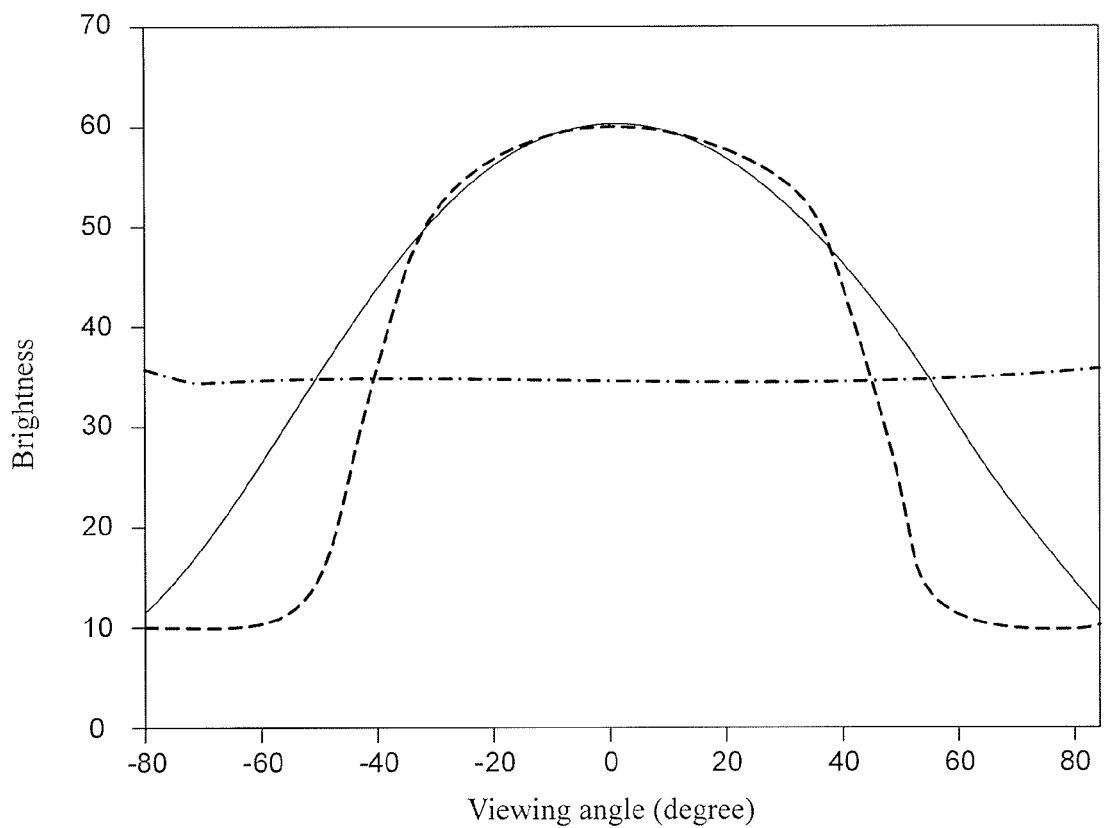
FIG. 5 is a graph showing the converging effect of the first embodiment of the enhanced prism film according to the present embodiment along the second direction.

FIG. 5 is a graph showing the converging effect of the first embodiment of the enhanced prism film according to the present embodiment along the second direction Y. A dash dot line represents brightness of the backlight without prism film, a dash line represents brightness of the backlight with the conventional prism film, and a sold line represents brightness of the backlight with the enhanced prism film according to the present invention. As shown in FIG. 5, since the conventional prism film has a straight line shape along the second direction Y, there is a dead zone in the vicinity of a viewing angle of 45° for the conventional prism film. The brightness drops significantly with increase of the view angle to almost 20% of the maximum brightness at a viewing angle of 60°. In comparison, since the enhanced prism film according to the present embodiment has an arch shape along the second direction, there is no dead zone at the viewing angle of 45° and the brightness drops slowly with the increase of viewing angle and can be kept at a relatively high level even at the viewing angle of 60°. Therefore, the enhanced prism film can exhibit a good converging effect and improve viewing angles along the second direction Y.

Figure 6:
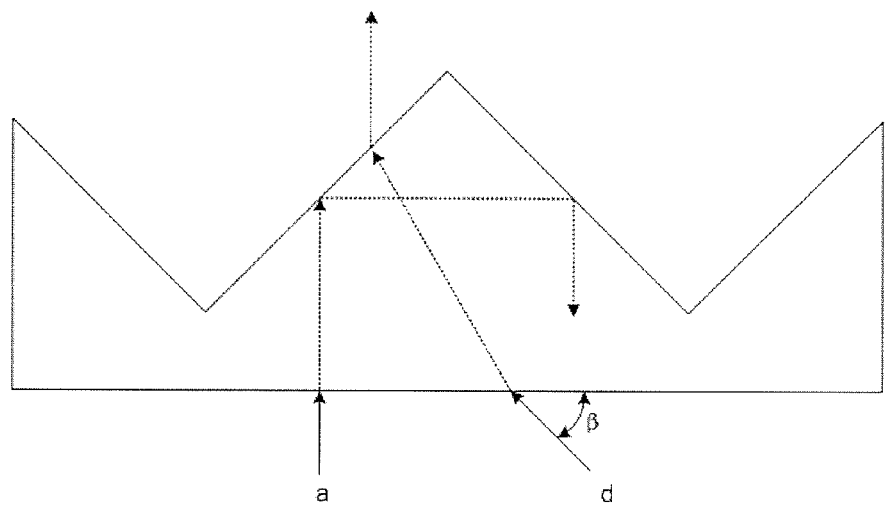
FIG. 6 is a schematic view showing the principle of converging effect of the first embodiment of the enhanced prism film according to the present embodiment along the first direction.
Figure 7:
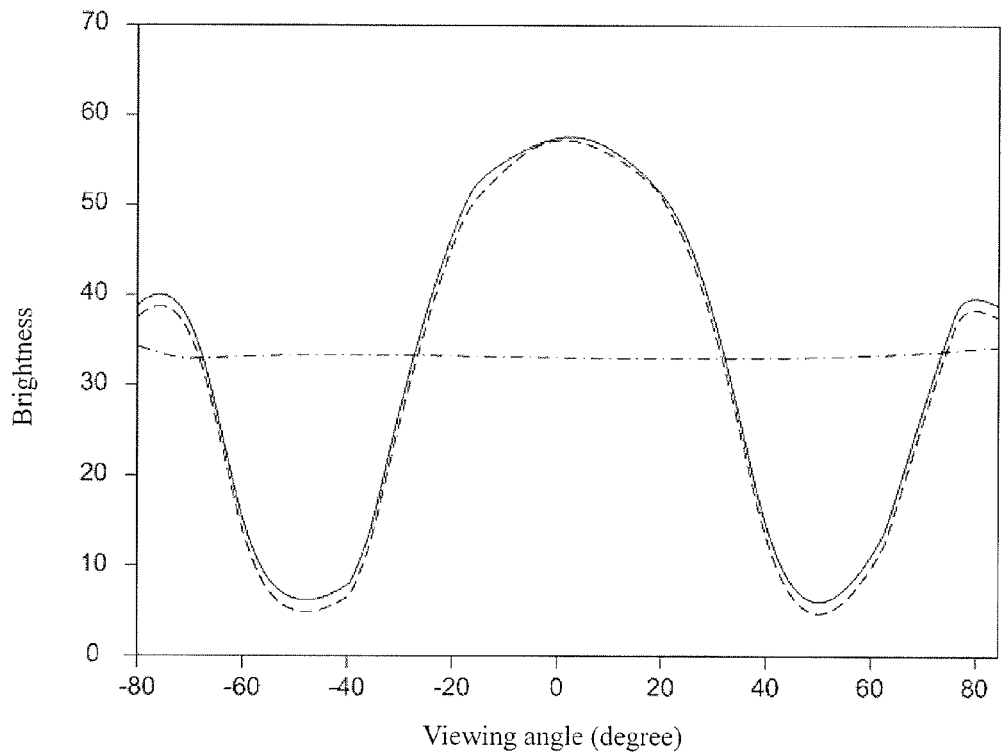
FIG. 7 is a graph showing the converging effect of the first embodiment of the enhanced prism film according to the present embodiment along the first direction.

FIG. 6 is a schematic view showing the principle of converging effect of the first embodiment of the enhanced prism film according to the present embodiment along the first direction X. FIG. 7 is a graph showing the converging effect of the first embodiment of the enhanced prism film according to the present embodiment along the first direction. Similarly, a dash dot line represents brightness of the backlight without prism film, a dash line represents brightness of the backlight with the conventional prism film, and a sold line represents brightness of the backlight with the enhanced prism film according to the present invention. Since the enhanced prism film according to the present embodiment also has a similar straight line shape along the first direction X as that of the conventional prism film, it can be seen that both the enhanced prism film and the conventional prism film have a similar converging effect with respect to the view angle from FIG. 7.

Furthermore, the upper surface of the enhanced prism film according to the present invention presents a discontinuous curved surface with a plurality of three-dimensional microstructures in a relatively random distribution, thus preventing the interference of the lights exiting from the enhanced prism film.

Figure 8:
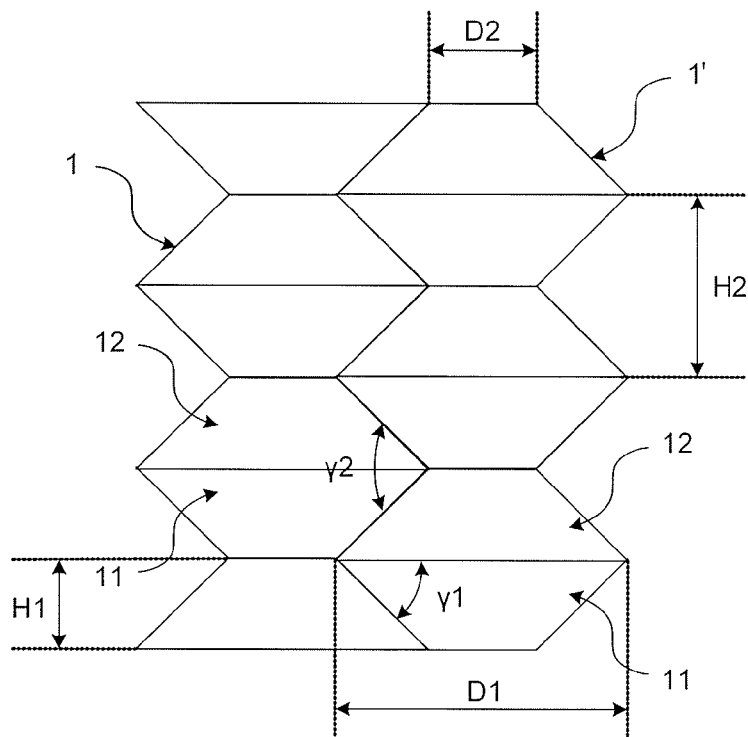
FIG. 8 is a schematic plan view showing a first embodiment of the enhanced prism film according to the present embodiment.

The optical properties of the enhanced prism film according to the embodiment of the present invention can be adjusted by setting the geometric parameters for the first partial truncated cone and the second partial truncated cone. FIG. 8 is a schematic plan view showing the first embodiment of the enhanced prism film according to the present embodiment of FIG. 1. As shown in FIG. 8, for example, both the first partial truncated cone 11 and the second partial truncated cone 12 are half regular truncated cones with a same three dimensional shape. The bottom of the first partial truncated cone and the second partial truncated cone has a width (i.e., diameter) D1 of 50-100 µm. The top of the first partial truncated cone and the second partial truncated cone has a width of 20-60 µm. The height H1 of the first partial truncated cone and the second partial truncated cone is 10-50 µm while each column-like element has a pitch H2=2*H1=20-100 µm along the longitudinal direction. The first partial truncated cone and the second partial truncated cone has an inclined angle γ1 of 30°-60° between the bottom and the cone surface of the partial truncated cones while the adjacent column-like elements have an engaging angle γ2=2*γ1=60°-120°. Preferably, γ2 is 90°.

Figure 9:
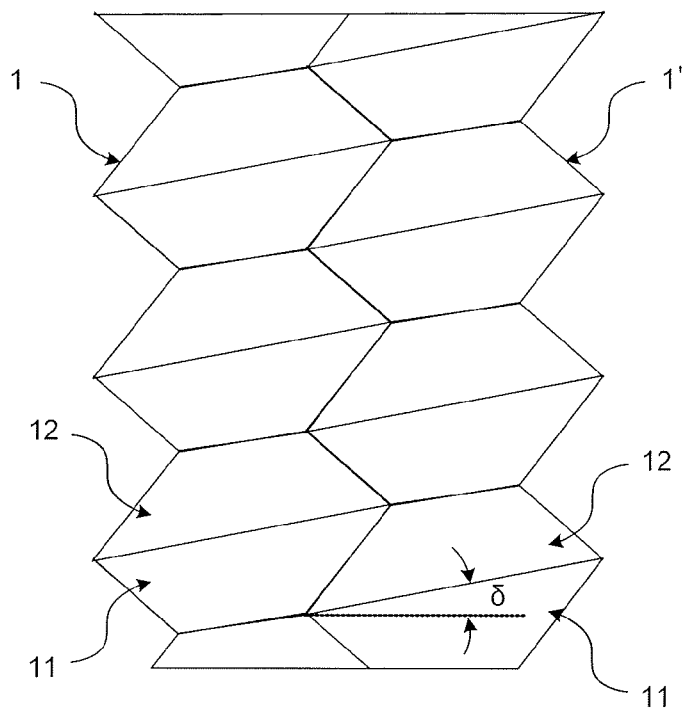
FIG. 9 is a schematic plan view showing a second embodiment of the enhanced prism film according to the present embodiment.

FIG. 9 is a schematic plan view showing a second embodiment of the enhanced prism film according to the present embodiment. The enhanced prism film of the present embodiment is substantially the same as the enhanced prism film of the first embodiment except that both the first and second half truncated cones are inclined half truncated cone, in which the bottom of the first partial truncated cone and the bottom of the second partial truncated cone has an angle δ relative to the second direction Y, where 0°≤δ≤45°, or −45° ≤δ≤0°.

Figure 10:
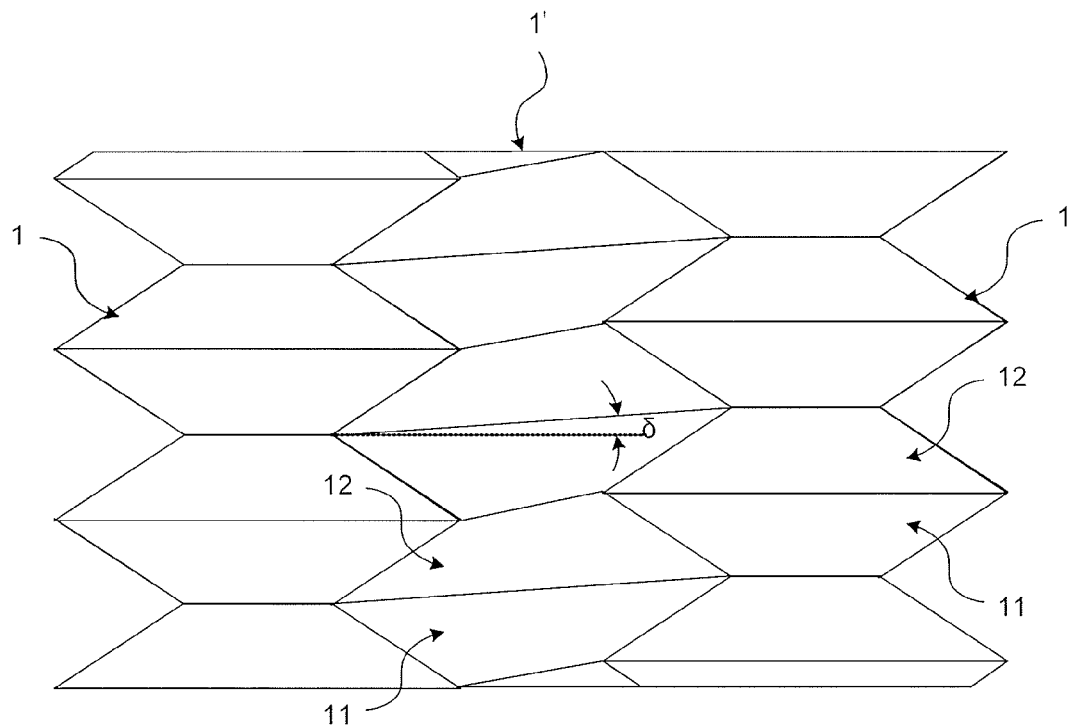
FIG. 10 is a schematic plan view showing a third embodiment of the enhanced prism film according to the present embodiment.
Figure 11:
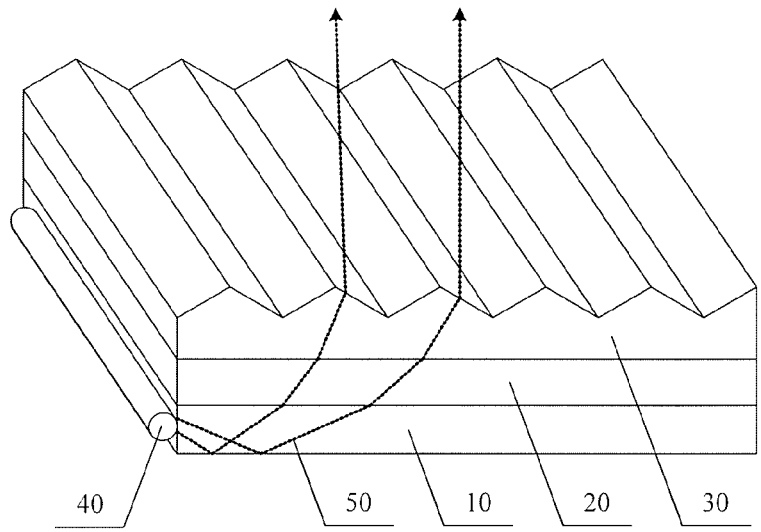
FIG. 11 is a schematic perspective view showing a conventional optical structural film of a backlight.

FIG. 10 is a schematic plan view showing a third embodiment of the enhanced prism film according to the present embodiment. The enhanced prism film of the present embodiment is a combination of the structures of the first embodiment and the second embodiment. For example, a first column-like element 1 can comprise partial regular truncated cones similar as that of the first embodiment while a second column-like element 1' abutting against the first column-like element can comprise partial inclined truncate cones similar as that of the second embodiment. Alternatively, both the first column-like element 1 and the second column-like element 1' can comprise partial inclined truncate cones similar as that of the second embodiment, in which the bottom of the first partial truncated cone and the bottom of the second partial truncated cone of a first column-like element 1 has an angle δ1 relative to the second direction, where 0°≤δ1≤45°, and the bottom of the first partial truncated cone and the bottom of the second partial truncated cone of a second column-like element 1' directly abutted against the first column-like element has an angle δ2 relative to the second direction, and where −45°≤δ2≤0°.

Furthermore, the enhance prism film of the embodiments according to the present invention can be readily formed by a pressing process with stamps, thus simplifying the manufacturing process with a fast rate and a relatively large throughput.

The present application contains subject matter related to that disclosed in Chinese priority patent application CN200910079139.9 in the State Intellectual Property Office of P. R. China filed on Mar. 3, 2009, the entire contents of which is hereby incorporated by reference.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. An enhanced prism film, comprising a plurality of column-like elements extending in a first direction, wherein the plurality of column-like elements abut against one another in a second direction so as to form a light exiting surface of the enhanced prism film with converging effect in both the first and second directions, the second direction being different from the first direction,
wherein a cross section of the light exiting surface of the enhanced prism film along the first direction comprises a plurality of triangles connected with each other and the cross section of the light exiting surface of the enhanced prism film along the second direction comprises a plurality of arches connected with each other,
wherein each column-like element comprises a plurality of first partial truncated cones and a plurality of second partial truncated cones alternately connected in such a manner that a bottom of each first partial truncated cone abuts against a bottom of an adjacent second partial truncated cone and a top of the first partial truncated cone abuts against a top of the adjacent second partial truncated cone, the bottom of the first partial truncated cone has a width larger than a width of the top of the first partial truncated cone, and the bottom of the second partial truncated cone has a width larger than a width of the top of the second partial truncated cone.

2. The enhanced prism film according to claim 1, wherein the first partial truncated cone of each column-like element abuts against the second partial truncated cone of the adjacent column-like element.

3. The enhanced prism film according to claim 1, wherein the bottom of the first partial truncated cone has a width of 50-100 µm and the bottom of the second partial truncated cone has a width of 50-100 µm, the top of the first partial truncated cone has a width of 20-60 µm and the top of the second partial truncated cone has a width of 20-60 µm.

4. The enhanced prism film according to claim 1, wherein the first partial truncated cone has a height of 10-50 µm, and the second partial truncated cone has a height of 10-50 µm.

5. The enhanced prism film according to claim 1, wherein the first partial truncated cone has an inclined angle of 30° -60° between the bottom and the top of the first partial truncated cone, and the second partial truncated cone has an inclined angle of 30° -60° between the bottom and the top of the second partial truncated cone.

6. The enhanced prism film according to claim 1, wherein the bottom of the first partial truncated cone and the bottom of the second partial truncated cone has an angle $\delta$ relative to the second direction, and where $0° \leq \delta \leq 45°$, or $-45° \leq \delta \leq 0°$.

7. The enhanced prism film according to claim 1, wherein the bottom of the first partial truncated cone and the bottom of the second partial truncated cone of a first column-like element has an angle $\delta 1$ relative to the second direction, where $0° \leq \delta 1 \leq 45°$, and the bottom of the first partial truncated cone and the bottom of the second partial truncated cone of a second column-like element directly abutted against the first column-like element has an angle $\delta 2$ relative to the second direction, where $-45° \leq \delta 2 \leq 0°$.

* * * * *